United States Patent Office 3,505,000
Patented Apr. 7, 1970

3,505,000
PROCESS FOR IMPRESSING EMBOSSED SEERSUCKER ON CREPE DESIGN OR PATTERN ON KNITTED FABRICS OF POLYVINYL ALCOHOL FIBERS
Koji Shinmura, Yao-shi, and Shigeyuki Kawai, Kyoto, Japan, assignors to Nagase & Co., Ltd., Osaka, Japan, a corporation of Japan, and Nihon Vinylon Co., Ltd., Tokyo, Japan, a corporation of Japan
No Drawing. Filed Jan. 3, 1967, Ser. No. 606,561
Int. Cl. D06q 1/00
U.S. Cl. 8—114.5      2 Claims

ABSTRACT OF THE DISCLOSURE

Woven or knitted piece goods of polyvinyl alcohol fibers having formalized degree of 0–40% (mol) are printed with a printing paste admixed with a benzamide or alkylbenzamide before steaming to impress embossed seersucker or crepe design or pattern thereon.

DISCLOSURE

The present invention relates to a process for impressing embossed seersucker or crepe design or pattern on woven or knitted piece goods or synthetic fibers derived from polyvinyl alcohol, known commercially as Vinylon, and produced by spinning from an aqueous solution of polyvinyl alcohol followed by formalization after heat-treatment to a formalized degree of 0–40% (mol).

It has heretofore been considered difficult to impress embossed seersucker or crepe design or pattern on woven or knitted piece goods of polyvinyl alcohol fibers, and consequently a method of changing the construction of piece goods has been employed. Furthermore, there are known methods, for example, a shrinking finish method of textures of polyvinyl alcohol synthetic fibers as disclosed in Japanese patent publication No. 3,147/60 and a partially creping method of textures comprising polyvinyl alcohol synthetic fibers as disclosed in Japanese patent publication No. 9,833/64. In each case of the above-mentioned two methods, however, an inorganic swelling agent such as zinc rhodanite and zinc chloride is employed, and therefore the percentage of shrinkage obtained therein is small, with the maximum of 20% or so. In addition, according to the two methods mentioned above, steaming is effected at a temperature as high as 103° C., thereby causing brittleness of the fibers and also resulting in a defect that hardens the polyvinyl alcohol fibers. These methods, therefore, are of no practical use.

The present invention relates to a process for impressing embossed seersucker or crepe design or pattern on woven or knitted piece goods of polyvinyl alcohol fibers, which comprises admixing benzamide or alkylbenzamides with a printing paste, printing the piece goods with the thus obtained printing paste using a screen or roller printing machine or a spray printing machine and shrinking the printed parts by steaming (60°–100° C.).

Preferable examples of the present alkylbenzamide are methylbenzamide, ethylbenzamide and propylbenzamide. The benzamide or alkylbenzamides are used in an amount of 1–50% by wt. of the product paste.

When an alcohol solvent, for example, methyl glycol ($CH_3CHOHCH_2OH$), in which a benzamide

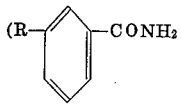

or alkylbenzamide

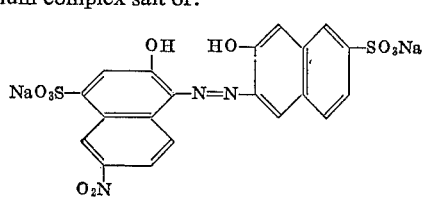

wherein R represents an alkyl group having 1 to 3 carbon atoms) has been dissolved, is admixed with a printing paste, for example, a tragacanth gum paste, piece goods of polyvinyl alcohol fibers are printed with the thus obtained printing paste using a screen or roller printing machine and the printed piece goods are steamed under atmospheric pressure, the benzamide or alkylbenzamide is absorbed as a swelling agent into the polyvinyl alcohol fibers and the printed parts of the goods are shrunk, thereby to impress embossed seersucker or crepe design or pattern thereon.

Preferable examples of the alcoholic solvent are methylglycol, ethyleneglycol, propyleneglycol, glycerine and polyethyleneglycol.

The characteristic feature of the effect of the process of the present invention resides in that the benzamide or alkylbenzamide used in the process of the present invention reacts with polyvinyl alcohol fibers at a relatively low temperature (60 to 100° C.) and the percentage of shrinkage obtained therein is high, which amounts to about 80%, wherein more distinct embossed design or pattern can be obtained than in conventional methods, and moreover no such brittleness of polyvinyl alcohol fibers may be involved therein as in conventional methods which comprises employing an inorganic substance such as zinc rhodanide and zinc chloride.

The present invention is illustrated by the following examples.

EXAMPLE 1

A printing paste comprising a mixture of the following composition was prepared.

|  | G. |
|---|---|
| Methylbenzamide | 100 |
| Methyl glycol | 350 |
| Tragacanth gum paste (a 10% solution) | 550 |
| Total | 1,000 |

When woven or knitted piece goods of polyvinyl alcohol fibers were printed the above obtained printing paste using a screen or roller printing machine and the printed goods were steamed for 20 minutes, only the printed parts thereof were shrunk. The thus printed goods were then washed with water and dried to obtain the goods having a distinct embossed design or pattern.

EXAMPLE 2

Printing the same as in Example 1 except using 100 g. of ethylbenzamide for methylbenzamide in the printing paste, was carried out, and almost the same results were obtained.

EXAMPLE 3

A printing paste was prepared by using a mixture of the following blend.

Neolan Black 2G, C. I.
Acid Black 54
Chromium complex salt of:

|  | g. |
|---|---|
| Methyl glycol | 350 |
| Propylbenzamide | 100 |
| Tragacanth gum paste (a 10% solution) | 545 |
| Total | 1,000 |

When woven knitted piece goods of polyvinyl alcohol fibers were printed with the above obtained mixed printing paste using a screen or roller printing machine and the thus printed goods were steamed for 20 minutes, only the printed parts thereof were dyed with black color and simultaneously shrunk to obtain a two-color effect of embossed design or pattern thereon. The thus obtained goods were washed with water and dried to obtain the desired piece goods.

EXAMPLE 4

250 g. of benzamide ($C_6H_5CONH_2$) was ground into fine powder so as to pass through a screen of printing machine, with which 35 g. of tragacanth gum (powder) and 1,000 cc. of water were admixed to prepare a printing paste. When woven or knitted piece goods of polyvinyl alcohol fibers were printed with the thus obtained printing paste using a screen printing machine and the printed goods were steamed for 5 to 10 minutes under atmospheric pressure, the benzamide was permeated into the fibers and only the printed parts thereof were shrunk. The thus obtained goods were then washed with water and dried to obtain the desired knitted fabrics.

What is claimed is:

1. In a process for impressing embossed seersucker or crepe design or pattern on woven or knitted piece goods of polyvinyl alcohol fibers by printing the woven or knitted piece goods with a printing paste and steaming the resultant piece goods to shrink the printed parts thereof, the improvement which comprises admixing the printing paste with a member selected from the group consisting of benzamide,

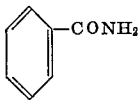

and alkylbenzamide,

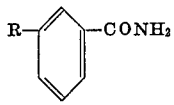

wherein R is an alkyl group having from 1 to 3 carbon atoms, which is dissolved in an alcoholic solvent and which is employed in an amount of 1 to 50% by weight of the paste, said alcoholic solvent being selected from the group consisting of methyl glycol, ethylene glycol, propylene glycol, glycerin and polyethylene glycol.

2. In a process for impressing embossed seersucker or crepe design or pattern on woven or knitted piece goods of polyvinyl alcohol fibers by printing the woven or knitted piece goods with a printing paste and steaming the resultant piece goods to shrink the printed parts thereof, the improvement which comprises admixng the printing paste with water and a member selected from the group consisting of benzamide,

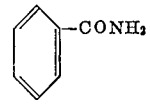

and alkylbenzamide,

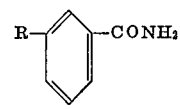

wherein R is an alkyl group having from 1 to 3 carbon atoms, in an amount of 1 to 50% by weight of the paste.

References Cited

UNITED STATES PATENTS

| 2,743,190 | 4/1956 | Vonaesch | 8—114.5 X |
| 3,053,609 | 9/1962 | Miller. | |
| 3,089,747 | 5/1963 | Welch | 8—114.5 |
| 3,234,160 | 2/1966 | Matsubayashi et al. | |

LEON D. ROSDOL, Primary Examiner

M. HALPERN, Assistant Examiner

U.S. Cl. X.R.

8—115, 115.5, 130.1; 260—913